April 18, 1939.  R. T. KNAPP  2,154,457
ROTARY MACHINE
Filed April 6, 1937  5 Sheets-Sheet 1
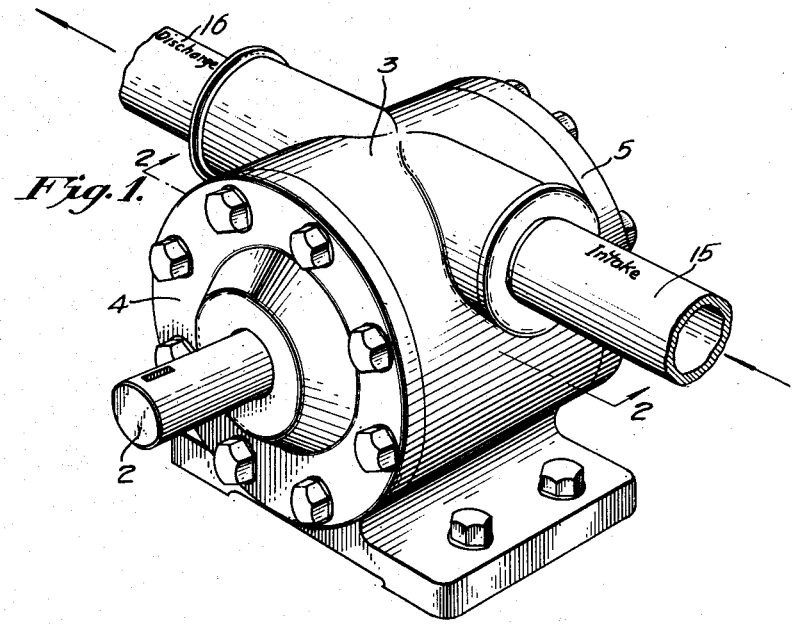
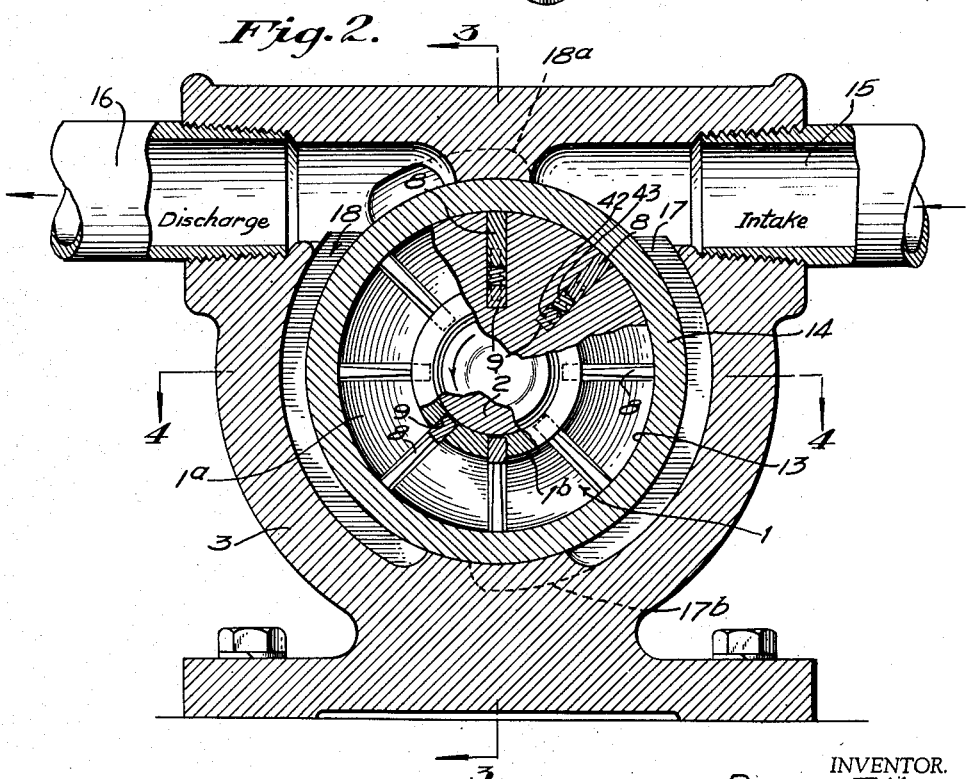
INVENTOR.
ROBERT T. KNAPP,
BY Arthur P. Knight and
Alfred W. Knight
ATTORNEYS

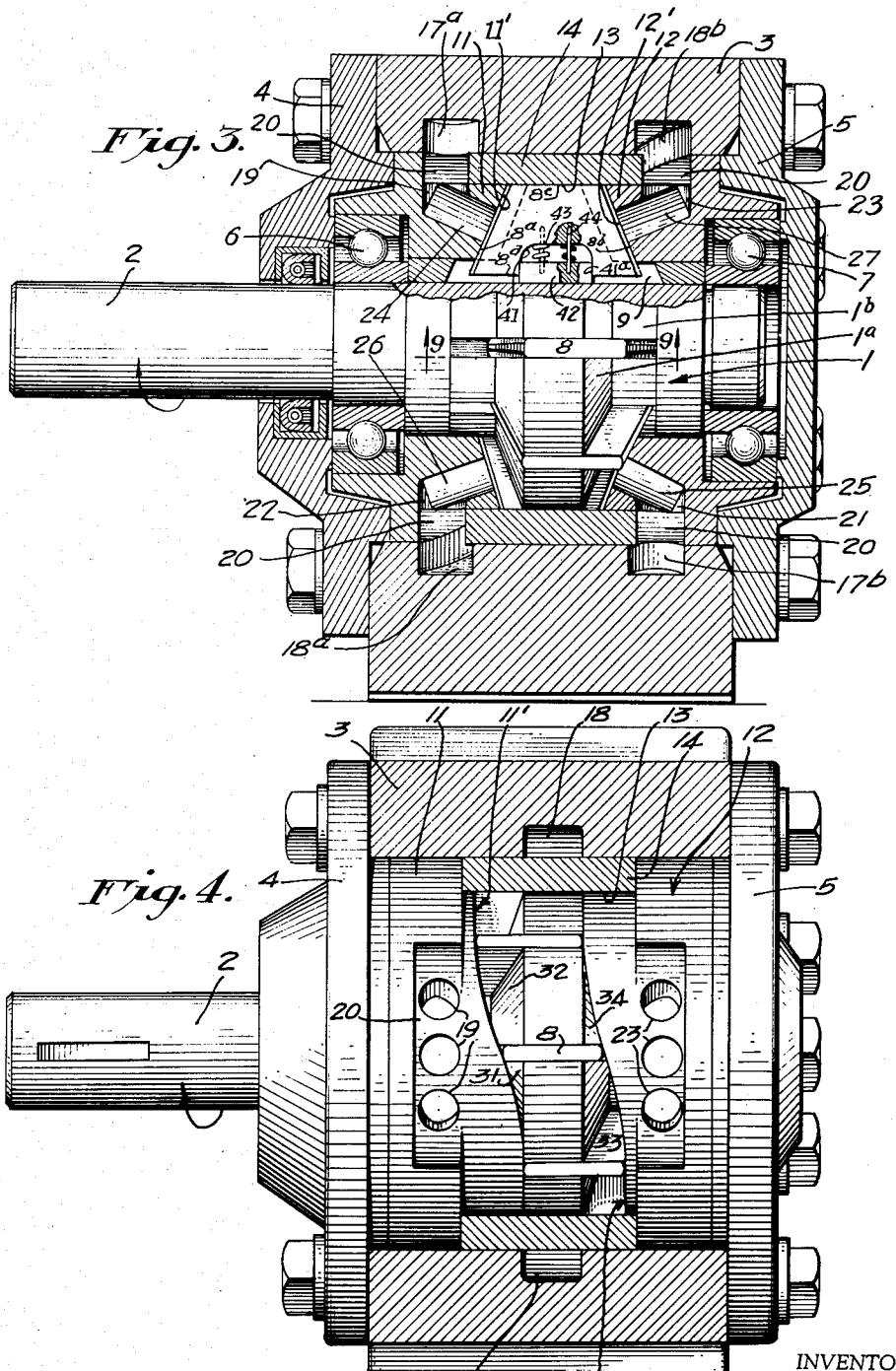

April 18, 1939.    R. T. KNAPP    2,154,457
ROTARY MACHINE
Filed April 6, 1937    5 Sheets-Sheet 3

INVENTOR.
ROBERT T. KNAPP,
BY
ATTORNEYS

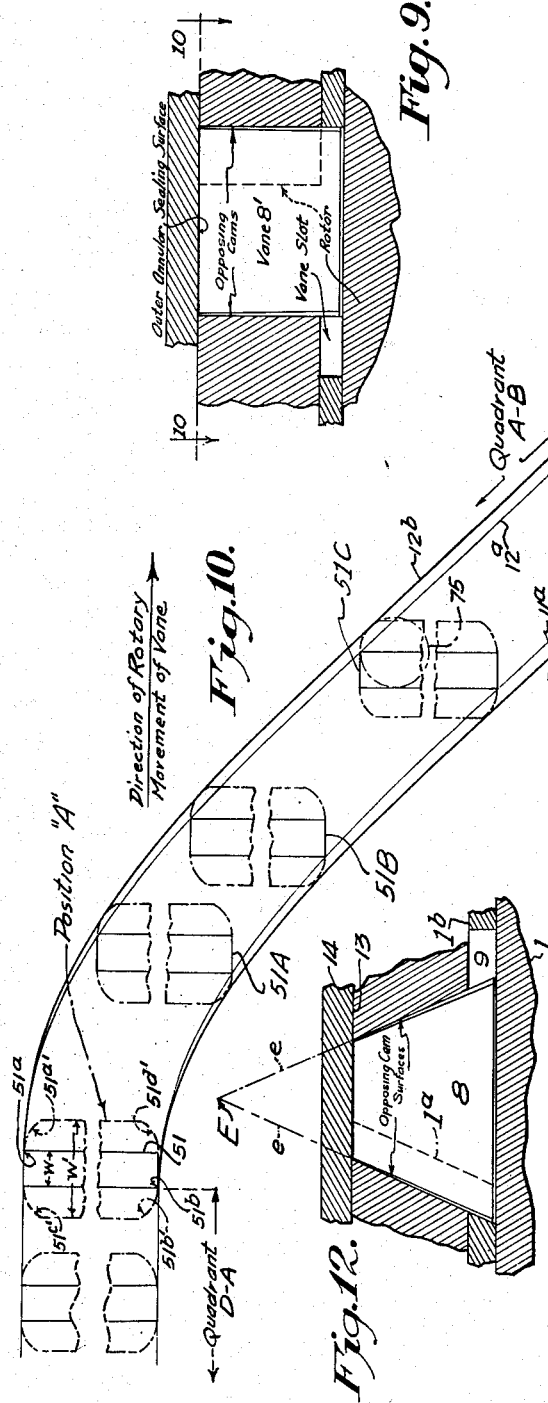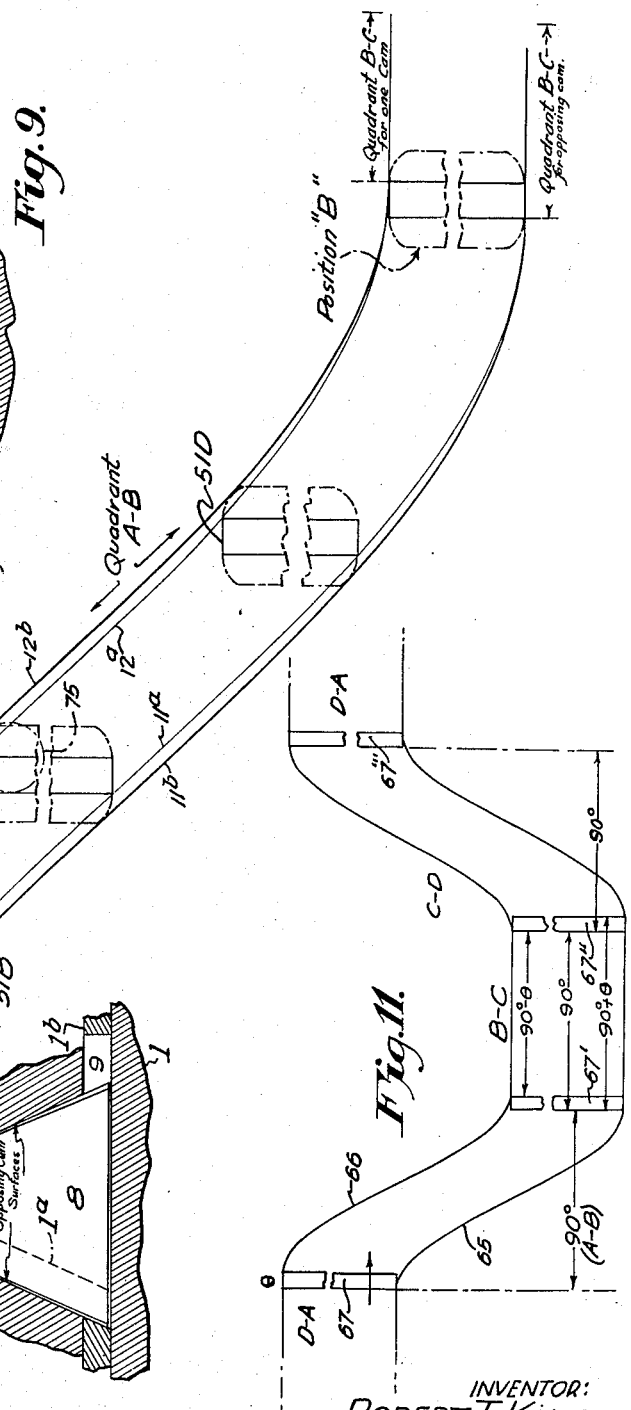

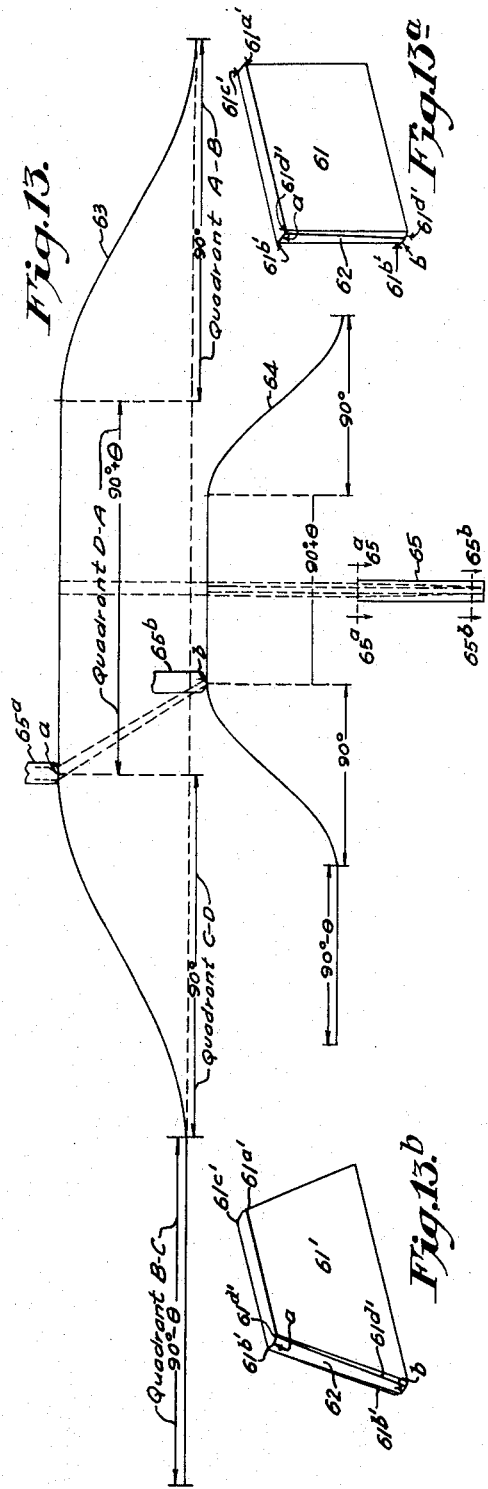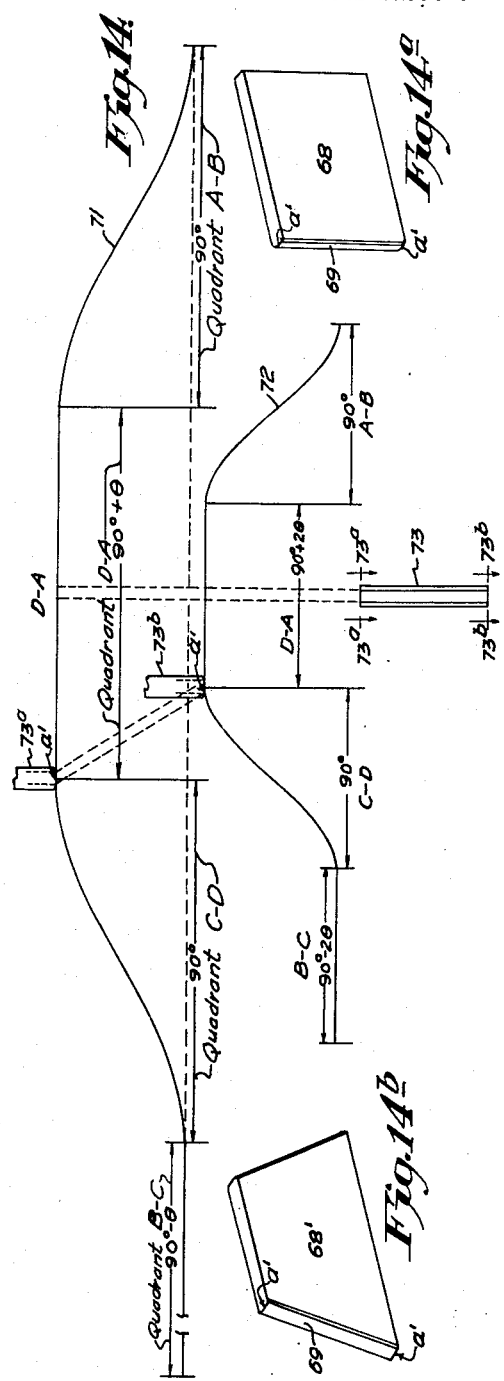

Patented Apr. 18, 1939

2,154,457

UNITED STATES PATENT OFFICE 2,154,457

ROTARY MACHINE

Robert T. Knapp, Pasadena, Calif., assignor of thirty-three and one-third per cent to Rudolph A. Riek and thirty-three and one-third per cent to Forest O. Riek, both of Los Angeles, Calif.

Application April 6, 1937, Serial No. 135,246

9 Claims. (Cl. 103—139)

This invention relates to positive fluid displacement rotary machines and particularly to a fluid displacement rotary machine of the laterally reciprocating or "sliding" vane type. The herein described features are particularly, but not exclusively, applicable to the type of machine described in my issued Patent No. 2,020,611, and in my copending application Serial No. 123,237, filed January 30, 1937.

The invention is particularly directed to that type of rotary machine which embodies a rotor member mounted within a concentric rotor chamber provided with coactingly shaped end walls disposed at the opposite axial ends of said rotor and defining vane-guiding cams, and vane members mounted on said rotor and extending transversely with respect to the plane of rotation thereof with their axial ends in engagement with the respective guiding cams, said vane members being slidably mounted on said rotor for laterally reciprocating motion, that is, for motion in a direction transverse to a plane of rotation of the rotor. As described in the above-mentioned patent and copending patent application, the vanes are preferably also slidable outwardly with respect to the axis of rotation, whereby the desired contact of the engaging surfaces is automatically maintained in the device during progressive wear on said vanes.

One of the particular objects of the present invention is to provide coactingly shaped vane members and guiding cams adapted to provide a constantly shifting line of contact between the vane members and the guiding cams during the laterally reciprocating movement of the individual vane members. A further object of the invention is to provide coactingly shaped vane and cam members adapted to provide a continuous engagement of the ends of the vane members with the respective guiding cams at all rotative positions of the vane members, and characterized by a circumferential orientation and configuration of the respective guiding cam surfaces on each of said cams in relation to the thickness of the vane members in the direction of rotation thereof, whereby continuous contact of said vane members with said cams is obtained throughout progressive wear on said vane members in operation of the device.

A further object of the invention is to provide a cooperating vane and guiding cam assembly in a device of the character described, in which the respective vane members are provided with convexly curved portions (with respect to the direction of thickness of said vanes along the path of rotation thereof) and in which the inclined guiding surfaces of said cams conform to the surface envelope developed by the curved portions of the respective vanes in the rotative movement thereof while undergoing longitudinal movement.

Further objects of the invention will be brought out in the following specific description of certain embodiments thereof, or will be apparent from such description. The accompanying drawings show certain modifications of the invention and illustrate certain relationships which may be employed in the formation of the respective guiding cams with relation to the type of vane member employed in the device, and referring thereto:

Fig. 1 is an external perspective view of a form of pump according to this invention;

Fig. 2 is a partly broken away transverse section thereof taken on line 2—2 in Fig. 1;

Fig. 3 is a vertical longitudinal section thereof taken on line 3—3 in Fig. 2;

Fig. 4 is a horizontal, partly sectional view taken on line 4—4 in Fig. 2;

Figure 5:
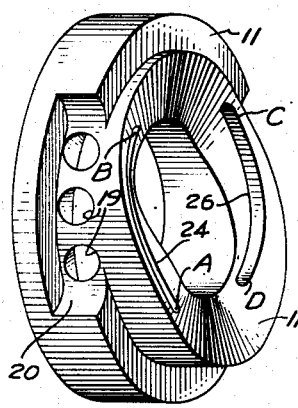
Figure 7:
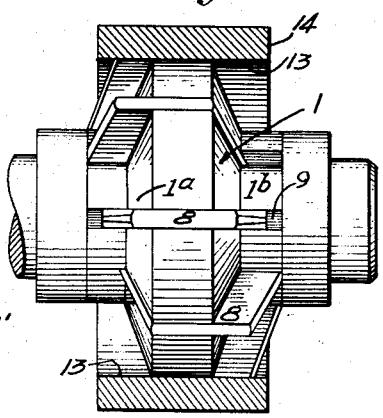
Figure 6:
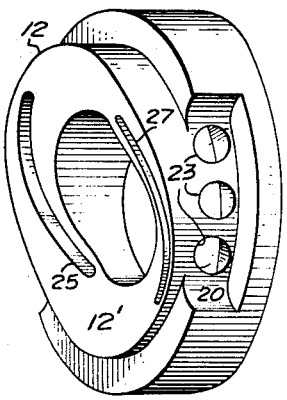
Figure 8:
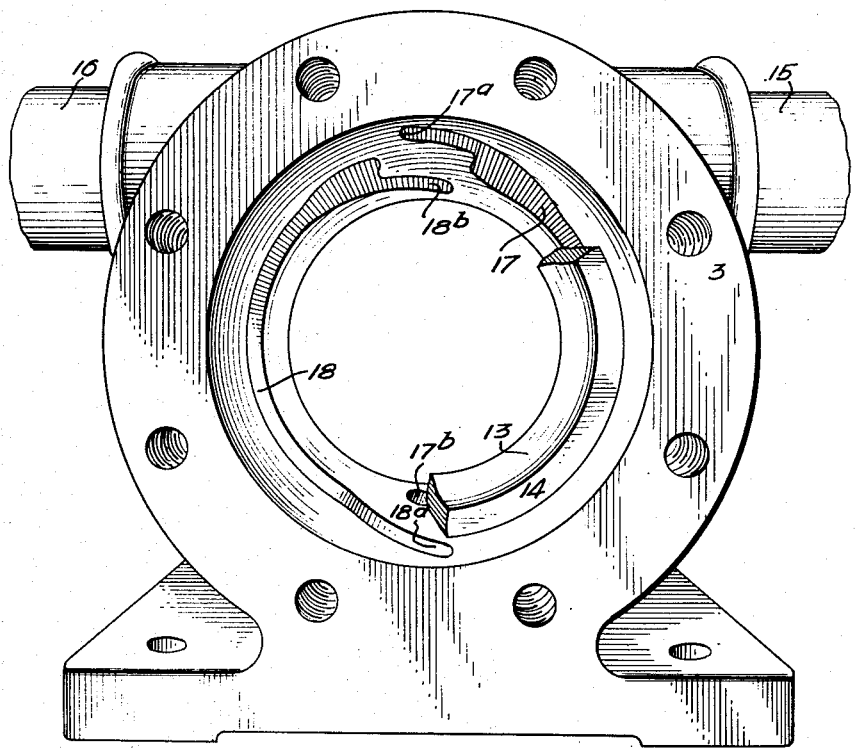

Figs. 5, 6, and 7 represent two cam plates and the rotor assembly, the rotor assembly being shown in plan view and the cam plates being turned outwardly therefrom and shown in correlated perspective;

Fig. 8 is an axial perspective showing a preferred form of fluid passages which may be provided in the housing or casing portion of the device;

Fig. 9 is a fragmentary view illustrating the employment of a vane having parallel axial ends, in an apparatus of the present invention, taken at a position corresponding to that shown by line 9—9 in Fig. 3;

Fig. 10 is a line development of two opposed portions of the axially separated guiding cams at the periphery, taken on line 10—10 in Fig. 9, showing the departure of the cam surfaces from a path parallel to the path of the associated vane member when a vane member of finite thickness is employed in the device, the intermediate portions of the vane being broken away to bring the cam curves closer together, for comparison purposes;

Fig. 11 is a diagrammatic showing comprising a line development of two opposing cams and a contacting vane, illustrating the variation in the angular extent of the flat and inclined cam portions as employed in one contemplation of the invention, this view being generally comparable to the showing in Fig. 10 but showing the complete circumferential extent of the cams;

Fig. 12 is a view corresponding to Fig. 9, illustrating particularly the manner in which the structure may be viewed to provide a showing comparable to that of Fig. 10 where a cam and vane structure comparable to that shown in Figs. 2 through 8 above is employed;

Fig. 13 is a diagrammatic development of the inner and outer peripheries of guiding cams of the type illustrated in Fig. 9 or Fig. 12 according to the present invention;

Fig. 13a is a perspective view of a vane of the type shown in Fig. 9, illustrating the construction of the end portions thereof in accordance with the showing in Fig. 13;

Fig. 13b is a view corresponding to Fig. 13a, illustrating the type of vane employed with a cam structure of the type illustrated in Fig. 12;

Fig. 14 is a view corresponding to that shown in Fig. 13, showing a line development of a cam surface of modified type;

Fig. 14a is a view corresponding to Fig. 13a, showing a vane construction of the type shown in Fig. 9, modified so as to be useful in connection with the type of cam surface shown in Fig. 14; and Fig. 14b is a view corresponding to the showing in Fig. 13b showing a vane construction of the type shown in Fig. 12, modified for use with the cam construction of the type shown in Fig. 14.

In the following illustrative structure shown in Figs. 1 through 8, the opposing cams are of such shape that the space therebetween is of greater axial length adjacent the central portion of the device than at the periphery. This particular construction is provided so that vane members having a longer axial dimension at their inner ends than at their outer ends can be employed, whereby wear on the sealing surfaces of the vanes may be automatically compensated for, as described in my above-mentioned patent and copending application. This particular form of the invention also embodies the use of cams which have a flat configuration along any line taken from the periphery and passing through the axis of the cam, whereby vanes which are straight along their axial end portions may be employed. As described in my above-mentioned issued patent, the vanes themselves may be of any one of several different shapes, either in the form of symmetrical trapezoids as specifically illustrated in Figs. 1 to 8 hereof, or with the end edge portions curved concavely or convexly after the manner shown in Figs. 14 and 15 of the above-mentioned issued patent. The principles of the present invention apply equally well to constructions employing any one of the above-described types of vanes, as well as to constructions in which the axial ends of the vanes are parallel with one another, as is more particularly brought out hereinafter. Similarly, the vanes may be so mounted in the rotor member as to have a substantially axial longitudinal movement, as in the specific form herein delineated, or as to have a longitudinal movement at an angle to the axis of the rotor, as in the form shown in Fig. 13 of Patent No. 2,020,611. Likewise, as in the present described form, the vanes may extend radially outwardly within the rotor, or at an angle to a radius, as shown in Fig. 12 of said issued patent. Combinations of these constructions are also within the contemplation of this invention, as will be apparent to one skilled in the art.

Referring to the form shown in Figs. 1 through 8, the device of the present invention may comprise a rotor 1 mounted on a shaft 2 and disposed within a concentric housing 3 provided with end plates 4 and 5, and suitable bearings such as shown at 6 and 7 for support of the shaft 2. The rotor 1 is provided with a plurality of vanes 8 slidably disposed within suitable longitudinal slots 9 in the rotor 1 in such manner as to extend transversely with respect to a plane of rotation of said rotor 1. The respective end plates 4 and 5 each carry a cam plate as shown at 11 and 12. The cams 11 and 12 are circular in shape and serve as vane guiding cams; the faces 11' and 12' of these cams are of such a shape as may be generated by the rotation of the vanes 8, and the specific construction of these cam surfaces with respect to the specific construction of the individual vanes is more particularly described hereinafter as an important phase or principal object of the present invention.

In the preferred form of the invention the vane members 8 are of a shape comparable to that of an isosceles trapezoid, the longer base of which lies within the slot 9. It is not essential that the "longer base" actually be parallel to the shorter base in view of the fact that this longer base has no sealing contact with the bottom of the slot 9, and hence may be of any shape as long as the full length thereof lies within the slot 9 at all positions in the reciprocating movement of the vane. The vane member is provided with guiding and sealing edges 8a, 8b, and 8c which conform to the sides and shorter base of the aforesaid isosceles trapezoid and bear respectively against the guiding cam faces 11' and 12', and the outer guiding and sealing face 13 provided on the housing 3 against which the outer or peripheral edge 8c of the vane 8 may bear. The outer face 13 is preferably cylindrical in shape and may be provided by means of an annulus 14 having a press fit within the housing 3, and the inner diameter of the annulus 14 is preferably only slightly greater than the outer diameter of the rotor 1, so as to provide a minimum clearance between said rotor and the face 13, whereby cross circulation of fluid between the displacement spaces or chambers at the respective axial ends of the rotor is substantially prevented.

The rotor 1 is shown as comprising a main body portion 1a of such diameter as to provide a running fit with the annulus 14 as above described, and hub portions 1b of reduced diameter projecting laterally at the respective ends of said body portion 1a. The main body 1a of the rotor is formed as two oppositely disposed truncated cones spaced by an intermediate cylindrical portion which constitutes the outside diameter of the rotor and, as above set forth, fits closely within the annulus 14. The angle which the conical faces of the aforesaid truncated cone make with the axis of the rotor preferably conforms to the angle of incidence of the cam faces 11' and 12' to said axis and to the angle which the vane edges 8a and 8b make with the edge 8c as is illustrated in Fig. 3. This is a structurally preferable but not necessary feature of the construction, and is of particular advantage where the device is employed for handling a substantially incompressible fluid. The slots 9 are formed in the body portion and hub portions of the rotor 1 and serve to support the vanes in their desired positions and cause the same to rotate with the rotor, while permitting free reciprocation of the vanes under the influence of the guiding cams. The rotor 1 cooperates with the guiding and sealing cam surfaces 11', 12', and 13 to define separate displacement chambers at the respective ends of the rotor body portion 1a.

The housing 3 is provided with an inlet 15 and an outlet 16 which communicate respectively with inlet passage 17 and outlet passage 18 arranged along the inner periphery of the housing 3 exteriorly of the annulus 14. The respective passages 17 and 18 are provided with portions which extend laterally outwardly of the annulus 14 as shown more particularly in Figs. 3 and 8 (for communication with certain inlet and discharge ports in the device, as hereinafter described). The cam plates 11 and 12 are provided with one or more inlet ports 19 and 21, respectively, which ports communicate with the above-mentioned laterally extending portions of the inlet passage 17 (said projecting portions being designated at 17a and 17b respectively), and with one or more discharge ports 22 and 23 which may respectively be disposed at approximately 180° from the inlet ports and which communicate with the laterally projecting portions 18a and 18b, respectively, of the discharge passage 18. In the present described form of device, the respective inlet and discharge ports communicates to the interior of the device, that is, to the fluid displacement chambers at the respective ends of the rotor 1, through circumferentially elongated passages in the cam plates, opening through the cam faces 11' and 12' at the inclined portions thereof, as indicated at 24, 25, 26, and 27, said passages 24 through 27 being preferably inclined in a spiral form so that the lateral edges 8a and 8b of the vanes 8 will be subjected to uniform wear in passing over these passages. The above-described arrangement of ports is given by way of example only, inasmuch as such ports will depend upon the use to which the device is to be put. For example, the above porting is adaptable primarily for use with a non-compressible fluid such as water, and when a compressible fluid is to be handled by the device, an entirely different type of porting may be employed, as will be apparent to one skilled in the art.

As may be visualized from Fig. 3, as the vanes 8 are subjected to wear and in view of the fact that the vanes will be forced outwardly against the surfaces 11', 12', and 13, an increased clearance will result between the inner edge 8d of the vane and the bottom of the slot 9, and the pressure difference at opposite sides of the rotor 1 which results from the opposing relation of the inlet and discharge ports will thus have a tendency to neutralize itself through the bottom portion of the slot underneath the individual vane. For this reason I preferably so modify the vanes as to produce an effective seal at the bottom portion of this slot, as shown particularly in Fig. 3. Referring to this figure, one of the vanes 8 is shown as cut away to provide a notch 41 at the inner edge 8d, preferably substantially centrally of the length of the vane, and a small sealing member 42 is slidably disposed within the aforesaid notch, said sealing member being of sufficient length to maintain close sealing engagement with the end walls 41a of said notch. The sealing member 42 is of such thickness as to have a minimum side clearance within the slot 9 and is maintained in place therein and in engagement with the bottom of the slot, against the effect of centrifugal force, through the agency of one or more compression springs 43 positioned to bear against the outer edge of the member 42 and against the inner edge of the notch 41. Suitable guide pins or the like may be provided as at 44 for the purpose of maintaining the springs 43 in their desired position.

From the above description it may be inferred that the cam faces 11' and 12' are formed upon the end plates 4 and 5. This construction, while entirely feasible, is not at present considered preferable in view of the fact that while the cam faces are preferably made of a wear-resistant material, it is not essential that the end plates 4 and 5 be formed of comparable material. In the actual showings, referring particularly to Figs. 3 and 4, the portions of the device on which the cam faces 11' and 12' are formed comprise separate ring-shaped elements 11 and 12 having inner ends of small diameter such that they may set within the annulus 14, and outer ends of somewhat increased diameter so as to abut against the lateral ends of said annulus 14. The construction of the elements 11 and 12 is more fully illustrated in Figs. 5 and 7. The respective end plates 4 and 5 may thus be caused to bear directly against the separate members 11 and 12 which carry the cam faces 11' and 12', firmly holding said members in fixed relation with respect to the housing 3. Suitable dowel members may be provided, as will be apparent to one skilled in the art, whereby the respective cam faces are placed in the desired orientation with respect to one another and with respect to the inlet and outlet passages 17 and 18. The inner diameter of the members 11 and 12 which provide the faces 11' and 12' is preferably such as to have a relatively small clearance with the hub portions 1b of the rotor 1. The enlarged outer ends of the members 11 and 12 are preferably recessed as at 20 adjacent the inlet and discharge ports, so that free flow of fluid between said ports and the respective inlet and outlet passages is provided.

In the above description, the casing or housing 3 is set forth as provided with respective inlet and outlet passage means such as shown at 15 through 18. It will be realized that the respective passages may be reversed in function so that the inlet 15 serves as an outlet, depending upon the direction of rotation of the rotor 1. I have, however, illustrated a specific direction of rotation by arrows in Figs. 1, 2, 3, and 4.

For purposes of illustration, the cam faces 11' and 12' may roughly be divided into 90° quadrants, as may be visualized from Figs. 5 and 6 (these quadrants actually depart from 90° in the preferred construction hereinafter described, but for a description of the operation of the device the above-mentioned 90° division is entirely adequate). Referring more particularly to Fig. 5, for the purpose of description, these quadrants are illustrated as extending respectively between the four points indicated at A, B, C, and D. The quadrants A—B and C—D are inclined with respect to the end faces of the rotor 1 in the direction of rotation, so as to effect longitudinal motion of the vanes in rotating through these quadrants, while the quadrants B—C and D—A are essentially "flat" in the direction of rotation, i. e., they are portions of true surfaces of revolution about the axis of rotation and conform to the surfaces generated by the ends of the vanes during rotation thereof through these quadrants without undergoing longitudinal movement. The quadrant A—B will represent an intake quadrant for the displacement chamber defined between the cam face 11' and the rotor 1 (assuming the delineated direction of rotation). The axial separation between the cam face 11' and the adjacent inclined face or side wall of the rotor 1 thus increases from the point A to the point B, and as a vane 8 passes from the position "A" to the position "B" (as also indicated in Fig. 10 diagrammatically), fluid is received from the intake 15 and its associated communicating passages 17, 17a, 19, and 24. Within the second quadrant B—C, the axial separation of the cam face 11' from the side wall of the rotor 1 remains unchanged. Upon rotation of the rotor 1, the vanes 8 within this quadrant do not travel transversely to the plane of the rotor and merely conduct the fluid from the quadrant A—B through the quadrant B—C to the quadrant C—D. The quadrant C—D is reversed with respect to the quadrant A—B and the axial separation of the face 11' from the side wall of the rotor 1 gradually diminishes to the clearance value at the point D. During rotation of the rotor 1, the entrapped fluid conveyed through the quadrant B—C is thus gradually forced outwardly of the device in quadrant C—D through the passage 26, thence through the ports 22 into the passages 18a, 18, and 16, as will be apparent to one skilled in the art. The operation of the right-hand side of this device as shown in Fig. 6 is inverted with respect to the operation at the left-hand side of the device, the discharge ports 23 being located at the upper portion of the housing, and the admission of fluid to the device being secured through the inlet ports 21 which communicate with the passage 17b shown at the lower right-hand corner of Fig. 3. In Fig. 4, therefore, the displacement chamber sections 31 and 32 defined by adjacent vanes located within the quadrant A—B at the left side of the device are thus seen to be expanding, and the displacement chamber sections 33 and 34 between the same vanes at the right side are thus seen to be contacting.

In the above-mentioned issued Patent No. 2,020,611 the opposing guiding cam surfaces were described as having an axial separation which was constant and equal to the effective vane length at all angular positions about the axis of rotation of the rotor member. The guiding cams were also described as being of the shape which would be generated by a trapezoidal plane, the longer parallel edge of which coincides with the generating axis and slides axially as the plane rotates, whereby the cross-section of the space between the cams taken upon a plane containing the axis is identical in shape with all similar cross-sections on all planes entering the axis. With such a construction, the lateral cam-contacting edges of the vane members are required to be of infinitesimal thickness, in order to continuously bear against the cam faces in engagement therewith at all rotative positions. It will be appreciated, however, that it is impracticable to provide a vane whose lateral edges will remain of infinitesimal thickness as wear occurs at such edges. Furthermore, edges of infinitesimal thickness would provide only line contact with the cam surfaces at all rotative positions, and would therefore not provide effective sealing engagement. For this reason the above-mentioned patent disclosed the use of a plurality of relatively thin vanes established in a laminated relation and freely movable with respect to each other so that, in effect, the individual vanes would act as vanes of infinitesimal thickness supporting one another whereby the desired mechanical strength of the complete structure could be established. It will be appreciated that, particularly where a non-compressible fluid is being handled, the principal proportion of the work done by the vanes takes place while the respective vanes pass through the flat portions of the cam surfaces, and that only sufficient engagement of the vanes with the inclined portions of the cams to positively guide the vanes and prevent chattering is necessary, inasmuch as the displacement chamber portions between adjacent vanes are open either to the exhaust ports or the inlet ports while a particular vane is passing along such inclined portion of the cam. However, where compressible fluids are being handled, close sealing engagement is desirable at substantially all rotative positions, and the construction of the present invention serves to provide effective sealing engagement of the vanes with the cam members and the outer annular sealing face over a comparatively large area of vane along the aforesaid "flat" portions of the cams, thereby increasing the wear resistance of the individual vanes while eliminating the expense and inconvenience incident to the use of the laminated vane construction, and also provides close sealing engagement while a vane is moving longitudinally along the inclined portions of the cams.

Assuming, for the purposes of illustration, that the longitudinally reciprocating movement of the vanes is desired to conform to simple harmonic motion, it will be appreciated that any given point in the vane must be caused to describe a sinusoidal path through space in rotating about the axis of the rotor 1 while undergoing longitudinal movement, and if the vanes were of infinitesimal thickness the respective guiding cams could each be formed in a sinusoidal configuration with the above-mentioned quadrants A—B, B—C, C—D, and D—A, each of 90°. If the vane is of a finite thickness, however, and is of substantially rectangular cross-section, it will be necessary to rotatively displace the quadrant A—B from the corresponding opposing quadrant an angular amount corresponding to the finite thickness of the blade, so that the leading corner of a blade will start along the inclined portion of one cam at the same time that the trailing corner of the vane at the other end starts along the face of the opposing cam. This is illustrated in Fig. 10 in which the rectangle shown in full lines at 51 represents a vane of substantially rectangular cross-section and of finite width $w$. In Fig. 9 I have illustrated a vane 8' having parallel axial ends, and the opposing cams are correspondingly formed with parallel faces which are normal to the axis of rotation of the rotor at all points. As indicated in Fig. 12, Fig. 10 may alternatively be considered to represent the appearance of cams which are adapted to engage and guide trapezoidal shaped vanes, if taken in such manner as to appear as though the eye point E of an observer were located on an intersection of two lineal projections $e, e$, passing outwardly from the axis along the respective cam faces 11' and 12' so that the development of each cam face is shown as a single line.

Referring again to Fig. 10, the corner of the blade shown at the upper right portion and designated 51a constitutes the leading corner of the vane at the end thereof which bears against one cam face (12', for example) and the diagonally opposite corner 51b of the vane represents the trailing corner at the opposite axial end of the vane. The light curved lines 11a and 12a designate parallel sine curves lying within the quadrant A—B and separated axially from one another a distance equal to the axial length of the vane 51 (as may be seen at the illustrated portions of the flat quadrants B—C and D—A) and rotatively displaced an angular distance corresponding to the width $w$ of said vane. As the vane 51 is rotated about the axis of the rotor 1, resulting, for example, in a left-to-right movement in Fig. 10, the leading corner portion 51a will constantly follow the curve 12a as shown at the respective positions 51A, 51B, 51C, and 51D, and the trailing corner portion 51b will constantly follow the curve 11a in the same manner. The tangent extensions of the curves at the extreme left and right ends of Fig. 10 may represent the end portions of the quadrants D—A and B—C, respectively, and it will be seen that the end portions of the vane throughout the full width $w$ thereof will be in sliding engagement with the cam faces 11' and 12' in the aforesaid quadrants D—A and B—C, but the vane would contact the inclined surfaces 11a and 12a at only the respective corner portions 51b and 51a. This will result in relatively rapid wear at said corner portions, which will shortly produce a clearance between said corner portions and the surfaces 11a and 12a which would be very objectionable where a compressible fluid were being handled, as a very large proportion of the fluid under treatment would be allowed to pass the ends of the vane and thus seriously impair the volumetric efficiency of the machine.

It will be appreciated that the outer face of the vane (corresponding to the face or edge 8c in Fig. 13) is continuously in engagement with the surface 13 of the annulus 14, thus limiting the outward movement of the vane to accommodate the same for wear, and that the corner portions 51a and 51b will never wear into uniform fit along the incline of the respective cams, inasmuch as the wear on these corner portions is tremendously greater than the wear on the flat portions which constitute the width of the vane along the axial ends corresponding to the ends 8a and 8b shown in Fig. 3. For this reason I extend the width of the vane to a suitable value such as indicated at $w'$ in dot-dash lines in Fig. 10, and round the corner portions of the vanes along suitable arcs having their respective centers so located that such arcs are tangent to the aforesaid flat portions at the ends of the vanes, such rounded corner portions being shown in dot-dash lines at 51a', 51b', 51c', and 51d'.

The rounded corner portions will describe curved envelopes which depart from the surfaces indicated by the curves 11a and 12a if the vane is caused to move along the same path as described above in connection with the movement of the rectangular cross-section vane along said surfaces 11a and 12a, and the cam surfaces against which the vane will bear will be required to conform to the envelope developed by the aforesaid curved corners upon rotative movement of the vane through the quadrant A—B. The shape of the new surfaces which are required for cooperation with the rounded corner vane is shown in heavy lines at 11b and 12b in Fig. 13 and these surfaces are seen to be tangent to the rounded corner portions 51a' and 51b' at all points of contact with the vane. The vane 51 of the extended width $w'$ will contact the flat quadrants of the cam surfaces through the width $w$ as in the previous case, and as the vane leaves a flat quadrant (for example, the quadrant D—A) and enters the quadrant A—B, the contact of the vane with the surfaces 11b and 12b will gradually shift forwardly and rearwardly respectively due to the progressive variation in inclination of these surfaces, until a maximum point is reached at the point of maximum slope of the curves 11b and 12b, after which the contact will gradually return toward the respective corner portions 51a and 51b above described when the end of the quadrant A—B is reached. The wear upon the vane is thus continuously shifting along the rounded corner portions throughout all rotative positions of the vane within which a longitudinal movement is produced by the inclined cam surfaces. This continuous shifting of the point of contact results in a uniform wear of the vane whereby the volumetric efficiency of the device is maintained at a maximum until the vanes have worn sufficiently that the inner edges 8d reach the outer ends of the slots 9 at the hub portions 1b, at which time replacement of the vanes with new vanes is required.

The diagrammatic showing in Fig. 10 may be viewed as a section taken at any position between the inner and outer peripheries of the cam faces 11' and 12', the rounded corner portions 51a' through 51d' being formed as cylindrical surfaces which are tangent to the adjacent flat portions at the respective ends of the vane and whose axes extend parallel to said flat portions. In view of the fact that the vanes are required to be of the same thickness at all portions whereby uniform clearances will be maintained within the slot 9, it will be appreciated that the cam surfaces 11' and 12' must be cooperatingly shaped with respect to the cylindrical surfaces which provide the rounded corners aforesaid so that the line of contact between the aforesaid cylindrical surfaces and the adjacent cam surfaces will extend parallel to the axis of such cylindrical surfaces. This cooperation between the vanes and the cams may be obtained in any one of several manners, two of which are hereinafter described as examples.

Referring more particularly to Figs. 13 and 13a, I have illustrated a vane 61 whose ends are provided with flat portions 62 having a width $a$ at the outer (upper) edge and a width $b$ at the inner (lower) edge. The vane 61 is rounded at the leading and trailing corners as at 61a', 61b', 61c', and 61d' (corresponding to 51a', 51b', 51c', and 51d' above) by the provision of cylindrical surfaces whose axes lie parallel to the respective ends 62 and intersect at the axis of rotation of the rotor which carries the vane. The respective axes of the cylindrical surfaces make an angle with one another which is equal to the angle subtended by the width $a$ of the flat end portion 62, which may be designated as $\theta$.

The flat portion 62 of the vane 61 will comprise a purely plane surface, where the vane is provided with parallel ends as shown in Fig. 13a. Where the ends of the vane are inclined with respect to each other, as in the form shown in Figs. 2 to 8, the corresponding portions 62 will comprise surfaces of revolution which increasingly depart from a plane surface as the angle between the ends becomes greater and greater, and will conform to a right circular cone whose half apex angle is equal to the angle which the vane end makes with the axis of rotation. In general, for vanes of any shape and any angular disposition, the corresponding surface portions 62 will conform to a surface of revolution generated by the rotation of the outline of the vane about the axis of the rotor.

As above brought out in connection with Fig. 10, the axially opposed cam surfaces are rotatively displaced an angular distance corresponding to the effective width of the flat portion at the end of the vane, and in view of the fact that if a uniform reciprocal movement of the vane is desired, it is necessary that the angular extent of the oppositely inclined portions of a cam be equivalent, wherefore the rotative displacement of the axially opposed cam portions is accommodated for within the flat quadrants such as the quadrants B—C and D—A. This is more fully illustrated in Fig. 11 in which the curve 65 represents a development of the cam face 11', for example, and the curve 66 represents a development of the cam face 12', at any one given distance from the axis about which the rotor 1 is caused to rotate. The showing in Fig. 11 extends approximately 360° and starts at the upper left-hand corner with a flat quadrant which may represent the quadrant D—A, extending into an inclined quadrant A—B, continuing into a flat quadrant B—C, thence into the other inclined quadrant C—D, and ending in the starting flat quadrant D—A. The portion of the curve 65 lying within the quadrant A—B is, for example, 90° in extent, and the portion of the curve 66 lying within the quadrant A—B is also 90° in extent, but is displaced rotatively from the corresponding portion of curve 65 by an angular amount θ which is controlled by the width of the vane, as above described. For the purpose of example, a vane is indicated diagrammatically at 67 in rectangular shape, representing a cross-section of the vane at the point of contact with the rounded corner portions omitted. It will be seen that the lower left-hand corner of the vane 67 is just starting down the incline of the curve 65 as the upper right-hand corner of the vane is starting down the incline of the curve 66. When the vane 67 has reached the position shown at 67', the aforesaid lower left and upper right corners are just entering the respective flat quadrant portions of the curves 65 and 66, and if it is desired that the vane stay at the end of its full longitudinal stroke for a 90° rotary movement, it will be necessary to extend the flat portion of the curve 65 within the quadrant B—C for an angular distance corresponding to 90° +θ, so that 90° of rotatory movement will have taken place when the lower right corner of the vane reaches the position 67" and starts up the succeeding inclined portion of the curve 65, and 90° of rotation will be required to cause the vane to reach the position 67'" at which it passes into the quadrant D—A. Similarly, the flat portion of the curve 66 through the quadrant B—C will of necessity extend for but 90° −θ. In like manner, the flat portion of the curve 65 within the quadrant D—A will correspond to the flat portion of the curve 66 within the quadrant B—C and the flat portion of the curve 66 within the quadrant D—A will correspond to the flat portion of the curve 65 within the quadrant B—C. The above conditions are also illustrated in Fig. 13 in connection with the type of vane shown at 61.

The curve 63 in Fig. 13 represents a development of the outer periphery of a cam useful according to this invention where a vane of the type shown at 61 is employed and the curve 64 represents a development of the same cam at the inner periphery. For the purpose of example, the curve 63 is shown to be twice the length of the curve 64. At 65 I have shown an end view of a vane of the type shown at 61, and at 65a and 65b I have shown the manner in which this vane engages the cam surface at the inner and outer peripheral portions thereof. If the curves 63 and 64 are taken to represent the developments of the inner and outer peripheries of a cam having an internal diameter of two inches and an external diameter of four inches, for example, and the angle subtended by the dimension a (θ) is the same as the angle subtended by the dimension b, as aforesaid, under the above dimensional proportions the dimension b at the inner end of the vane will be one-half the dimension a. The relative proportions of these two dimensions are indicated at a and b respectively, at the position 65a—65b.

In Fig. 13b I have illustrated a vane of the symmetrical trapezoid outline, and the various corners and edges of this vane which correspond functionally to the corners and edges of the vane 61 shown in Fig. 13a are numbered similarly. It will be appreciated that the view shown at 65 will be identical independent of which type of vane is employed.

Instead of providing a tapering flat end portion as at 62 for the vane, I may provide a vane 68 whose ends are provided with flat portions 69 having a uniform width a' along the entire vertical height of said ends, as shown in Fig. 14a. When the vane of the type shown at 68 is employed, it is necessary to modify the cam surface slightly in order to secure the above-described line contact. The curves illustrated at 71 and 72 in Fig. 14 correspond to the curves 63 and 64 shown in Fig. 13, and represent the modified form of cam surface which may be used in connection with a vane of the type shown at 68. Where the width of the flat portions at the ends of the vanes remains the same from the inner to the outer edge of the vane, the angle subtended by the flat portion at the inner end of the vane will be twice the angle subtended by the flat portion at the outer edge of the vane where the inner diameter of the cam is one-half the outer diameter thereof. (As a matter of fact, the angles are not exactly in the proportion of two to one inasmuch as the vane width represents a subtended chord, but the error induced by considering the aforesaid width dimension as an arc of the angle rather than a chord is much less than the mechanical fabricating tolerances permissible.) The numeral 73 represents an end view of the vane 68, and vane portions shown at 73a and 73b correspond to the vane portions shown at 65a and 65b in Fig. 13. In view of the fact that the flat portion 69 of the vane 68 subtends an angle 2θ at the inner periphery of the cam and an angle θ at the outer periphery, it will be apparent that the flat quadrants B—C and D—A at the inner periphery of the cam are required to be 90° −2θ and 90° +2θ respectively. In Fig. 14b I have shown a vane 68', having a symmetrical trapezoidal outline and corresponding to the vane shown at 61' in Fig. 13b.

It will be appreciated that it is not essential that the "flat" portions at the respective ends of a vane be of the same angular length, although such a construction is considered preferable from a fabrication standpoint. In the event that the "flat" portions at the respective ends of a vane differ significantly, the angular extents of the opposing "flat" portions of the guiding cams will be caused to differ by an amount equal to the sums of the angular lengths of the vane at the two ends, as will be apparent to one skilled in the art.

A cam having a surface of the type illustrated in Fig. 13 may be formed by employing a rotating cutting or grinding tool whose cutting face has a radius equal to the radius of formation of the rounded corners for the vane 68 and causing such cutter to move axially with respect to a rotating cam blank in accordance with the angular dimensions of the respective quadrants as shown in Fig. 13, while causing the axis of curvature of the rotary cutter to remain in a radial plane. In this manner the cutter will be moved along a sine curve through the quadrants A—B and C—D (each of 90° in extent), will be motionless for 90° —θ through quadrant B—C, and for 90° +θ through quadrant D—A. The surface formed by the cutter will depart from the true sine wave form in the same manner that the curves 11b and 12b depart from the sine curves 11a and 12a shown in Fig. 10 where the radius of the cutter is identical with the radius of formation of the aforesaid corner portions, so that, in effect, the shape of the cam conforms to the envelope generated by the aforesaid rounded corners in one complete revolution of a vane about the axis of rotation. The position of a rotary cutter may be illustrated by the dot-dash circle shown at 75 in Fig. 10.

It will be appreciated that the opposing cams 11 and 12 are identical and may be provided by using two cams formed by the above process in opposing relation, the cooperating similarity of the cams being brought out in connection with the description of Fig. 11.

A cam having a surface in accordance with the showing in Fig. 14 may be formed by the use of a rotary cutting or grinding tool whose cutting face has the same radius as the radius of formation of the rounded corners of the vane 68 and moved axially of the cam blank in the same manner as described immediately above in connection with the formation of a cam surface corresponding to the showing in Fig. 10, with the exception that the axis of curvature of the cutting or grinding tool will be constrained in a plane parallel to a radial plane and spaced therefrom a distance equal to one-half of the dimension a'. This one setting of the cutting tool will serve to form the inclined cam through one quadrant, and an equivalent setting parallel to and at the opposite side of the aforesaid radial plane may be employed to form the other inclined cam surface, while the same cutting tool may be set with its axis of curvature within said radial plane in forming the flat quadrants of the cam surfaces, as will be apparent to one skilled in the art.

It will be appreciated that the above description is specific to the conception of imparting a simple harmonic movement to the vane during its axial travel, but the invention is fully operative in the formation of cooperating cam and vane surfaces such that the vane is given a movement other than that of simple harmonic motion during its axial travel. It will be appreciated that any desired type of motion may be secured by the simple expedient of imparting that particular motion to the mechanism which carries the rotary cutting or grinding tool, and that the vane will always contact the formed cam surface if the radius and position of the rotary cutting tool agrees with the radius and position of the rounded corners on the vane in accordance with the teachings of this invention. Similarly, it may in some cases be desirable to change the angular extents and number of the several "flat" and inclined portions of the cam structures, for particular purposes, although the relation between the effective width of a vane and the relative angular extents of the opposing flat portions of the cam surfaces is necessarily preserved in accordance with the teaching of this invention if any such flat portions are present on the cam. It is similarly contemplated that it is not essential that the rounded corner portions of the vanes be circular in cross-section, inasmuch as other cross-sections such as elliptical may equivalently be employed as long as the cutting or grinding tool used to form the cooperating cam surface is so shaped as to be adapted to cut away the cam blank along the same path as that taken by the rounded corner portions of the vane during its travel along the finished cam surfaces.

Other modifications of the invention will be apparent to those skilled in the art, and I do not choose to be limited to the herein described and delineated embodiments, but rather to the scope of the appended claims. It will be understood that the features of the present invention as above described are not limited in their application to rotary machines in which the reciprocal movement of the vanes during rotation is only longitudinal with respect to the vanes, but may also be incorporated advantageously in rotary machines in which the vanes also undergo inward and outward movement during rotation, it being appreciated that the considerations involved in the formation of the cooperating vane and cam structures of this invention are applicable to any rotary machine in which the vanes are reciprocated in a direction having a substantial component parallel to the axis of rotation.

The vane members are necessarily of a one-piece construction, i. e., integral vane members having a pronounced rigidity or fixity of dimension in the direction of reciprocal movement thereof, wherefore the axial ends of the vane bearing against the respective opposing cam surfaces will cause an integral movement of the vane in response to the guiding action of such cam surfaces.

I claim:

1. In a rotary machine of the sliding vane type, the combination of an integral vane having inner and outer edges and two ends; means for rotating said vane about an axis whose direction has a substantial component parallel to the length of said vane between said ends while permitting longitudinal sliding movement thereof; curved cam means engaging one end of said vane during rotation thereof through a certain angle and operable to cause longitudinal unitary movement of said vane; the other end of said vane having a portion convexly curved with respect to the direction of its thickness along its path of rotation; and an inclined cam engaging said other end of the vane and having an inclined curved surface conforming to the surface envelope developed by said curved portion of the vane in the movement of said vane through said certain angle.

2. In a rotary machine of the sliding vane type, the combination of housing means defining a chamber and having two opposing spaced cam surfaces at the respective axial ends of said chamber; a rotor body disposed within said chamber for rotation therein, and having end walls facing toward the respective cam surfaces; and a plurality of integral vanes slidably mounted on said rotor body for unitary movement in a direction having a substantial component parallel to the axis of rotation of said rotor body and having their ends in engagement with the respective cam surfaces; each of said cam surfaces having two curved portions inclined oppositely with respect to the plane of rotation of said rotor body and disposed in opposing relation to similarly inclined portions on the other cam surface, each end of each vane being provided with portions curved convexly with respect to the direction of its circumferential thickness, and each pair of opposing similarly inclined cam surface portions being so formed as to continuously engage said curved end portions at the respective ends of each vane throughout the movement of said vane over said inclined portion.

3. In a rotary machine of the sliding vane type, the combination of a casing provided with a chamber; a rotor body concentrically mounted in said chamber and provided with a plurality of integral vanes adapted for longitudinal sliding unitary movement with respect to said rotor body in a direction transverse to the plane of rotation thereof; and guiding cams having cooperatingly disposed inclined guiding and sealing surfaces for said vanes disposed at the respective axial ends of said rotor body in engagement with the respective ends of said vanes and cooperating to reciprocate said vanes longitudinally of said rotor body; each of said vanes being of finite thickness in the direction of rotation thereof within said chamber, and the respective ends of each of said vanes being provided with a leading convexly curved corner portion and a trailing convexly curved corner portion, and the inclined surfaces of said cams being curved and successively conforming to the surface envelopes alternately developed by said leading and trailing portions of said vanes during the reciprocal movements thereof with respect to said rotor body.

4. A rotary machine as set forth in claim 3, each of said guiding cams being provided with a curved portion inclined toward said rotor and a curved portion inclined away from said rotor, and a substantially flat portion intermediate said inclined portions, and the respective inclined portions of one guiding cam being so oriented circumferentially with respect to the inclined surfaces of the opposingly disposed guiding cam that when the leading corner portion of a vane is in contact with an inclined portion of one of said guiding cams the trailing corner portion of said vane at the opposite end of said vane is in contact with the inclined portion of the opposingly disposed guiding cam.

5. A rotary machine as set forth in claim 3, each of said guiding cams being provided with a curved portion inclined toward said rotor and a curved portion inclined away from said rotor, and a substantially flat portion intermediate said inclined portions, and the respective inclined portions of one guiding cam being so oriented circumferentially with respect to the inclined surfaces of the opposingly disposed guiding cam that when the leading corner portion of a vane is in contact with an inclined portion of one of said guiding cams the trailing corner portion of said vane at the opposite end of said vane is in contact with the inclined portion of the opposingly disposed guiding cam, and the respective inclined surfaces of each of said guiding cams being adapted to alternately engage the leading and trailing portions of each of said vanes.

6. A rotary machine comprising housing means defining a fluid displacement chamber having a cylindrical outer wall and two opposing spaced cam surfaces at the respective axial ends of said chamber; a rotor member disposed within said fluid displacement chamber and mounted for rotation about the axis of, and in sealing engagement with, said cylindrical outer wall, and having end walls facing toward the respective cam surfaces; and a plurality of integral vanes slidably mounted on said rotor member for unitary movement transverse to the plane of rotation of said rotor member and having their outer edges in sealing engagement with said outer wall and their ends in engagement with the respective cam surfaces, and the respective ends of each of said vanes being provided with a leading convexly curved corner portion and a trailing convexly curved corner portion with respect to the direction of rotation thereof within said chamber; each cam surface being provided with successive oppositely inclined curved portions and the two cam surfaces being disposed with similarly inclined portions opposite one another, said similarly inclined portions of the respective cam surfaces conforming respectively to envelopes generated by the leading rounded corner portion at one end of a vane and the trailing rounded corner portion at the other end of said vane, upon rotation of said vane through the angular length of said portion while said vane is undergoing longitudinal movement in a direction from said one end toward said other end.

7. In a rotary machine of the sliding vane type, the combination of a rotor body mounted for rotation within a chamber; a plurality of integral vanes mounted on said rotor body for longitudinal sliding unitary movement with respect thereto in a direction transverse to the plane of rotation thereof; and guiding cams for said vanes, disposed at the respective axial ends of said rotor body in engagement with the respective ends of said vanes, each of said cams being provided with successive inclined curved portions which are inclined oppositely with respect to said rotor body in the direction of rotation of said rotor body, and with portions intermediate said inclined portions which conform to surfaces of revolution about the axis of rotation of said rotor body, the respective cams being so oriented with respect to one another that similarly inclined portions thereof are disposed opposite one another; each of said vanes being provided at each end with an end face of finite width in the direction of rotation conforming to the surfaces of said intermediate portions of the respective cams and with convexly smoothly curved corner portions tangent to said end face at the leading and trailing edges thereof; said opposing inclined portions of said cams conforming respectively to envelopes generated by the leading curved corner portion at one end of a vane and the trailing curved corner portion at the other end of said vane, upon rotation of said vane through the angular length of said portion while said vane is undergoing longitudinal movement in a direction from said one end toward said other end.

8. In a rotary machine, the construction set forth in claim 7, in which the opposing intermediate portions of the respective cams differ in angular length an amount equal to the sum of the finite widths of a vane at the two ends thereof.

9. In a rotary machine of the sliding vane type, the combination of a casing provided with a chamber; a rotor body concentrically mounted in said chamber and provided with a plurality of integral vanes adapted for longitudinal sliding unitary movement with respect to said rotor body in a direction transverse to the plane of rotation thereof; and opposed guiding cams having cooperatingly disposed inclined guiding and sealing surfaces for said vanes disposed at the respective axial ends of said rotor body in engagement with the respective ends of said vanes and cooperating to reciprocate said vanes longitudinally of said rotor body, each of said guiding cams being provided with a curved portion inclined toward said rotor and a curved portion inclined away from said rotor and a substantially flat portion intermediate said inclined portions, each of said curved portions comprising a surface of varying curvature; each of said vanes being of finite thickness in the direction of rotation thereof within said chamber, and each end of each of said vanes being provided with a leading convexly curved corner portion and a trailing convexly curved corner portion, and the respective curved portions of one guiding cam being so oriented circumferentially with respect to the curved portions of the opposingly disposed guiding cam that when a leading corner portion of a vane is in contact with a curved portion of one of said guiding cams the trailing corner portion of said vane at the opposite end of said vane is in contact with a curved portion of the opposingly disposed guiding cam, said curved surfaces of said cams successively conforming to the surface envelopes alternately developed by said leading and trailing corner portions of said vanes during the reciprocal movement thereof with respect to said rotor body, whereby the contact of the respective leading and trailing corner portions of a vane with the adjacent guiding and sealing cam surface is caused to continuously shift along such corner portions while said vane is moved along the portions of said cam surfaces which are of varying curvature.

ROBERT T. KNAPP.